April 23, 1929.　　H. M. SCHRYVER　　1,710,245

EYEGLASS SHIELD

Filed Jan. 29, 1927

Inventor
Hazel M. Schryver.
By her Attorney
John J Thompson

Patented Apr. 23, 1929.

1,710,245

UNITED STATES PATENT OFFICE.

HAZEL M. SCHRYVER, OF RHINEBECK, NEW YORK.

EYEGLASS SHIELD.

Application filed January 29, 1927. Serial No. 164,441.

This invention relates to a shield or auxiliary lens for eyeglasses or spectacles, and more particularly to the idea of providing a lens or shield of colored material which will convert the regular glasses into sun glasses to prevent glare and to protect the eyes, especially in automobile driving, and when the driver is obliged to use glasses for proper vision, and on account of their fitness to the eyes, can not substitute colored glasses in their place, as a colored lens can not be ground to take the place of the regular clear glass lens.

While I am aware that colored lenses have been applied as an attachment to eyeglasses, they have either been applied by the use of a heavy cumbersome frame, or by the use of certain clips, secured thereto and adapted to engage the frame of the glasses, but such clips or attaching means have been of such a nature as to obstruct the clear vision, and create an object which is constantly before the sight of the wearer, which is not only bad for the sight, but dangerous in driving.

The object of the present invention is to provide a pair (one for each eye) of shields or lenses, constructed of glass, celluloid or other suitable material, and of any tint or color desired, and approximately of the same shape and size as the frame of the glasses to which they are to be detachably secured, although the size and shape may be varied to correspond to the style of the glasses frame.

Another object of the invention is to provide a glare preventing shield of this kind, that shall be cheap, durable and efficient, and so constructed that they may be carried in a small container, or in the glasses case, and be readily and quickly attachable to the glasses frame in a secure manner, and not be jarred loose or blown off.

Still another object being to provide attaching means that shall be universal in that they may be quickly adapted to fit any style or size of eyeglasses or spectacles.

With these and other objects in view, my invention consists in certain construction and combination of parts as will hereinafter be fully described and claimed, and illustrated in the accompanying drawings which form a part hereof and in which like figures of reference refer to corresponding parts in all of the views, and it is fully understood that slight changes may be made without departing from the spirit of the invention.

In the drawings:—

Referring to the drawings:—

Figure 1:
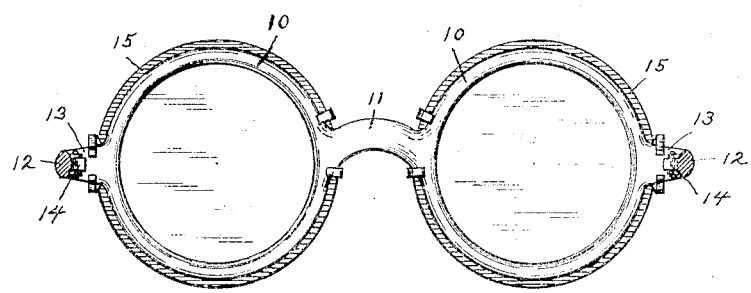
Figure 1 is a rear view of a pair of glasses of the shell type, showing the shields as applied thereto.
Figure 2:
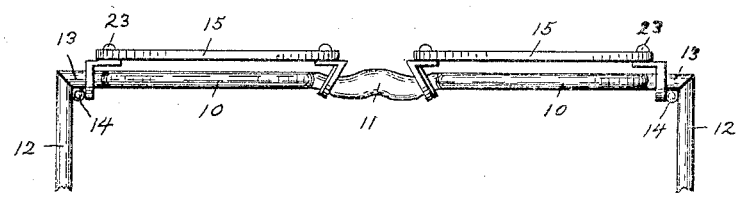
Figure 2 is a top edge view of the same.
Figures 3, 4, 5:
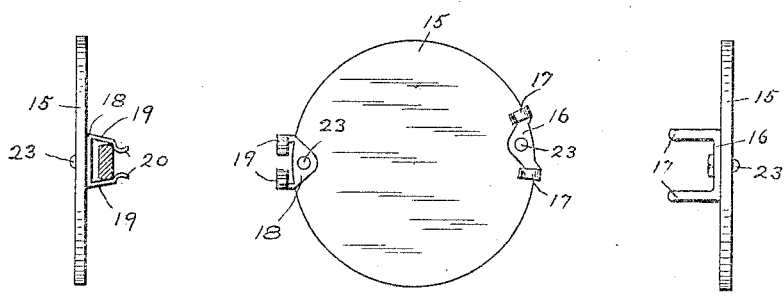
Figure 3 is a side view, showing one of the forms of clips employed.
Figure 4 is a rear view of one of the shields, showing the clips attached thereo.
Figure 5 shows an edge view of the shield, with the nose piece clip in its original form before having been bent to fit the frame of the glasses.

The usual form of shell eyeglasses and frames are indicated, and comprise the lens mountings 10, joined together by the nose piece 11 and provided with the bows 12, which are hinged to the ends of the mounting extensions 13 by the hinges 14 in the usual manner.

The shield or auxiliary lens 15 of glass or other suitable material is herewith shown as circular in shape, but may be of any desired shape, and is provided with the attaching holes near the periphery thereof, and located in the proper relation to correspond to the shape of the frame.

The attaching clips are two in number, one for the nose piece and one for the mounting extension 13; the one for the nose piece 11, comprising a body portion 16 formed with a hole through which is passed a screw or rivet 23 for attaching the same to the lens 15 by one of the holes therein, and said body portion 16 is provided with two fingers 17 spaced apart and formed of semi-flexible material such as a suitable metal which can be bent to provide a pair of hooked fingers to embrace the nose piece 11, and slightly hook over the frame 10.

The other clip, comprises a body portion 18 adapted to be secured to the lens in a like manner, and is formed with a pair of resilient fingers 19 formed to grasp the extension 13, and having the outwardly curved ends 20, so that the same may be readily snapped on or off of said extension 13.

Figure 6:
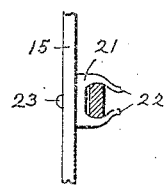
Figure 6 shows another form of clip, composed of rubber or like material having resilient fingers.

As shown in Figure 6 this clip may be in the form of a molded part 21 of rubber or other suitable material, and formed with the two fingers 22 for engaging the extension 13.

In the first fitting or adapting of the shields to the glasses frame, the clip 18 is first snapped over the extension 13, and the fingers 17 are then bent as indicated to engage the nose piece 11, and any excess length of material cut off, and the shield is then removed by applying outward pressure to the clip 18 to snap it off of the extension 13, when the clip 16 may be unhooked without changing its shape, and the shield is now ready for use.

By this construction it will be noted that the attaching clips are secured to the nose piece 11, and to the extension 13, and not to the frame 10, and in no manner can they be seen by the wearer while looking through the glasses, the body of the clips being covered by the frame 10, and not projecting over the lenses of the glasses.

Having thus described my invention, what I claim as new and desire to secure by Letters Patent, is:

In a glare shield for eyeglasses of the class described, comprising an auxiliary lens, attaching means secured thereto and comprising a pair of hooked metallic members for engagement with the nose piece of the glasses, and a resilient metallic U-shaped member for engagement with the frame extension adjacent to the bow.

In testimony whereof I hereunto affix my signature.

HAZEL M. SCHRYVER.